United States Patent [19]

Kondo

[11] Patent Number: 5,493,501
[45] Date of Patent: Feb. 20, 1996

[54] PRODUCTION CONTROL SYSTEM SELECTING OPTIMUM DISPATCHING RULE

[75] Inventor: Hiroshi Kondo, Tokyo, Japan

[73] Assignee: NEC Corporation, Tokyo, Japan

[21] Appl. No.: 286,348

[22] Filed: Aug. 5, 1994

[30] Foreign Application Priority Data

Aug. 5, 1993 [JP] Japan .................................. 5-193796

[51] Int. Cl.⁶ .......................... G06F 19/00; G06F 17/60
[52] U.S. Cl. ........................ 364/468; 364/554; 364/578
[58] Field of Search .................................. 364/468, 550, 364/551.01, 578, 554; 395/50, 54

[56] References Cited

U.S. PATENT DOCUMENTS

| | | | |
|---|---|---|---|
| 4,802,094 | 1/1989 | Nakamura et al. | 364/468 |
| 4,887,218 | 12/1989 | Natarajan | 364/468 |
| 4,901,242 | 2/1990 | Kotan | 364/468 |
| 4,967,381 | 10/1990 | Lane et al. | 364/551.01 |
| 4,975,865 | 12/1990 | Carrette et al. | 364/550 |
| 5,047,947 | 9/1991 | Stump | 364/468 |
| 5,229,948 | 7/1993 | Wei et al. | 364/468 |
| 5,241,482 | 8/1993 | Iida et al. | 364/468 |
| 5,311,759 | 5/1994 | Mangrulkar et al. | 72/12 |
| 5,339,257 | 8/1994 | Layden et al. | 364/552 |
| 5,434,792 | 7/1995 | Saka et al. | 364/468 |
| 5,440,478 | 8/1995 | Fisher et al. | 364/188 |

FOREIGN PATENT DOCUMENTS 2-224954  9/1990  Japan .

*Primary Examiner*—Paul P. Gordon
*Attorney, Agent, or Firm*—Foley & Lardner

[57] ABSTRACT

A production control system for electron devices manufactured through many stages including plural apparatuses comprises dispatching rule storing means, a statistical analyzer and a simulator. The dispatching rule storing means stores plural dispatching rules including a first-in first-out rule, three of lot selective rules and dead line rule. The statistical analyzer accumulates status data representing the status off each of apparatuses and lots to be processed for a fixed period of time, and generates a statistical data by statistically processing the status data as accumulated. The simulator simulates the production line to evaluate an efficiency thereof based on the statistical data and each one of the plural dispatching rules. An optimum dispatching rule is selected which provides the optimum efficiency for the production line among the plural dispatching rules.

9 Claims, 5 Drawing Sheets

EVALUATION TABLE

| NAME OF DISPATCHING RULE | EVALUATION SCORE |
|---|---|
| FIRST-IN FIRST-OUT RULE | 80 |
| LOT SELECTIVE RULE "A" | 65 |
| LOT SELECTIVE RULE "B" | |
| LOT SELECTIVE RULE "C" | |
| DEAD LINE RULE | |

FIG. 4

PRODUCTION CONTROL SYSTEM SELECTING OPTIMUM DISPATCHING RULE

BACKGROUND OF THE INVENTION (a) Field of the Invention

The present invention relates to a production control system for manufacturing various types of electron devices through various stages in which a plurality of apparatuses of the same kind operate for processing the devices.

(b) Description of the Related Art

In conventional production control systems for manufacturing electron devices of various types, productive instruction data are determined based on a state of a production line predicted by a simulator, or else productive instruction data are determined by an expert system in which know-how of experts for efficiently operating the production line is stored as a knowledge base. These systems are intended to solve a problem of how to convert collected status data off the production line into productive instruction data. These systems are introduced because such a conversion cannot be attained by a simple algorithm in the case of production of electron devices which involves a large number of and many kinds of stages, many kinds of orders of stages, and many kinds of manners of processing in the equipment through which lots of devices pass.

FIG. 1 is a block diagram showing a conventional production control system for manufacturing electron devices. An example of such a production control system is disclosed in Japanese Patent Laid-open Publication No. 2-224954. As shown in FIG. 1, the production control system comprises data collecting means 12 for collecting status data, such as current operating conditions and progress of production, from a production line 11 including a variety of apparatuses assigned for a plurality of stages including stage 1 through stage n, productive instruction data inputting means 31 for inputting productive instruction data such as designation of type and quantity of product to be manufactured, and a central processing unit 32 which has an expert system 33 including a knowledge base 35 containing accumulated know-how of experts and a simulator 34 for predicting operating conditions at an arbitrary future point of time and which receives external data from the productive instruction data inputting means 31 and from the data collecting means 12 to create and transmit a new productive instruction data for the production line 11 via communicating means 13.

The expert system 33 creates appropriate productive instruction data from data, which are obtained from the data collecting means 12 and from the productive instruction data inputting means 31, on the basis of know-how of experts accumulated in the knowledge base 35. During this data creating process by the expert system 33, if a judging rule in the knowledge base 35 requires data on a future state of production on the production line 11, the expert system 33 directs the simulator 34 to predict a future state on the production line 11, then creates productive instruction data based on the results of the prediction. The simulator 32 calculates prediction data based on data obtained from the data collecting means 12 and reports the prediction data to the expert system 33. The expert system 33 then transfers productive instruction data thus obtained to the production line including apparatuses of stage 1 through stage n via the communicating means 13.

In the conventional production control system as described above, the expert system 33 is generally assigned to allocate lots to the individual apparatuses, and the simulator 34 is assigned to predict a state of the production line when required, whereby an optimum productive instruction data is obtained for carrying out efficient production. The conventional production control system, however, involves various problems when applied to a complex production line as for semiconductor devices.

One of those problems is that productive instruction data cannot be created promptly because it takes a lot of time for a simulator to carry out simulation. This is because a simulation is quite complex due to the facts that a process for the production of one semiconductor device involves hundreds of stages, from tens to hundreds of patterns regarding the order of stages in the process and nearly a hundred kinds of apparatuses involved in the process and that a single process employs the same apparatus repeatedly with or without looping. For example, simulation for a single process takes one hour or more, although the amount of time required for simulation varies more or less depending on production lines. This raises a problem of a delay in start-up of a production line and a reduction in availability factor of the apparatuses.

Another problem is that, although incorporating of know-how of experts into a system is applicable to stages of up to certain complexity, it cannot provide the optimum productive instruction data to the production line for semiconductor device in which many types of products are produced in the same production line and in which the production stages are diversified and complex. This is partly because know-how varies depending on types of products or stages, partly because it is therefore impossible to obtain know-how which is common among the stages, and partly because it is not obvious whether know-how itself is most suited to the process.

SUMMARY OF THE INVENTION

In view of the foregoing, an object of the present invention is to provide a production control system which carries out simulation periodically to create an optimum productive instruction data at any time even for a production line having diversified and complex stages and which can provide productive instruction data to the production line when it is necessary for implementing efficient operations thereof.

The present invention provides a production control system for a production line including at least one apparatus for each of a plurality of production stages to manufacture lots of products, the production control system comprising: data collecting means for collecting status data of the at least one apparatus for each of the production stages and data on lots to be processed; a data analyzer for accumulating the status data for a predetermined period of time to generate a statistical data periodically by statistically processing the status data; a simulator having at least one simulation model receiving the statistical data for simulating periodically at least a portion of the production line to evaluate an efficiency thereof based on each of a plurality of dispatching rules; and dispatching means for selecting an optimum dispatching rule among the plurality of dispatching rules based on the result of the simulation by the simulator to provide a productive instruction data for allocating a lot of product-to-be to one of the at least one apparatus based on the optimum dispatching rule.

In accordance with the the present invention, data collecting means of the production control system accumulates data on the production line for a predetermined period of time, for example, one week or one month while the production line is operating for processing. Various dispatching rules are stored in the control system for simulating a state of production using the dispatching rules, and examined in a simulation to evaluate differences in efficiency of the production line among the cases employing different dispatching rules. The dispatching rules may include a first-in first-out rule, at least one lot selective rule and a dead line rule. Hence, an optimum dispatching rule found in the simulation to provides an optimal result in the production line can be employed among the dispatching rules examined in the simulation.

BRIEF DESCRIPTION OF THE DRAWINGS

The above and further objects as well as features and advantages of the present invention will be more apparent from the following description, taken in conjunction with the accompanying drawings in which:

FIG. 4 is an evaluation table showing an example of evaluation of individual dispatching rules.

DESCRIPTION OF THE PREFERRED EMBODIMENTS

Now, the present invention will be described with reference to the drawings.

Figure 1:
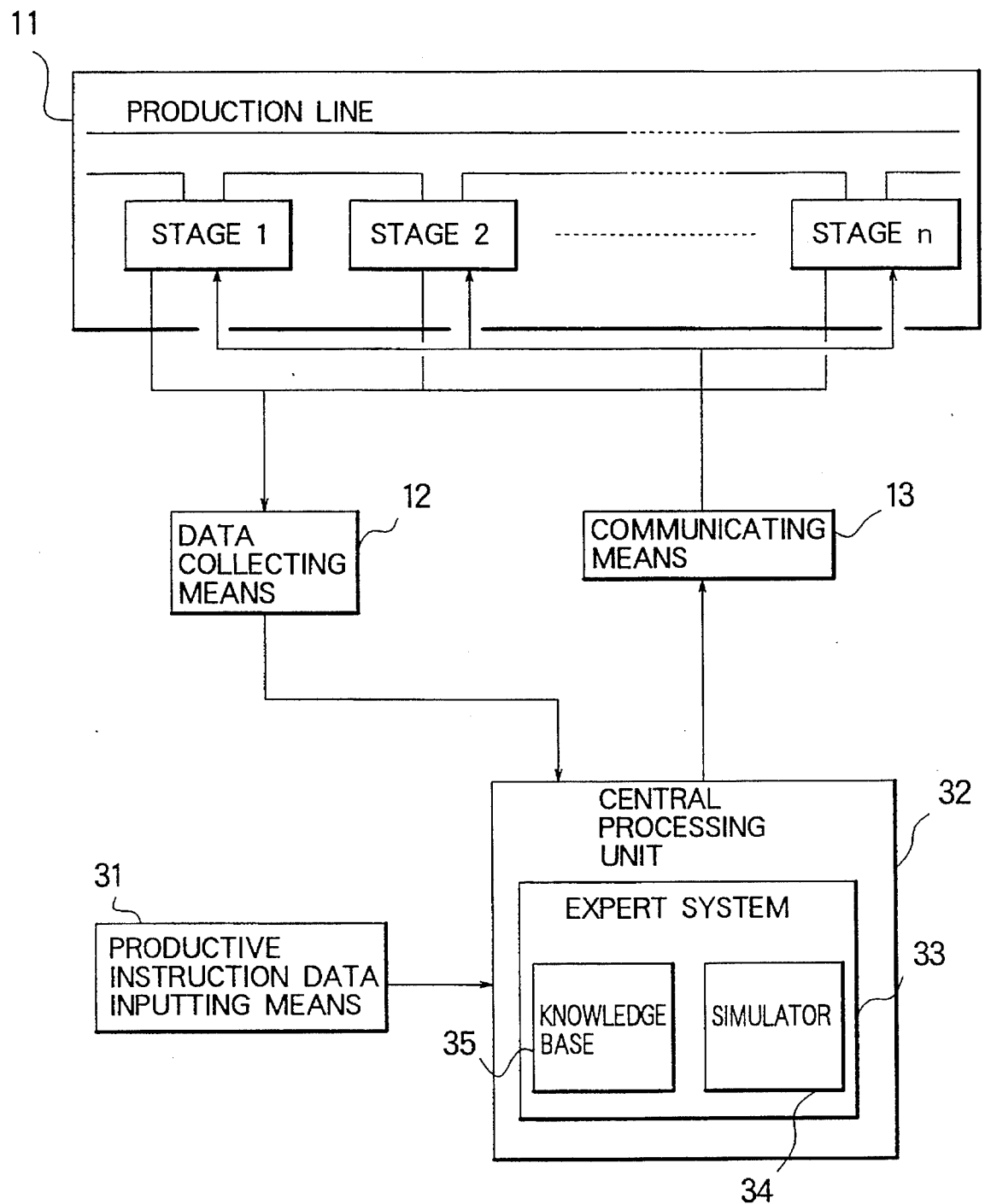
FIG. 1 is a block diagram showing a conventional production control system.
Figure 2:
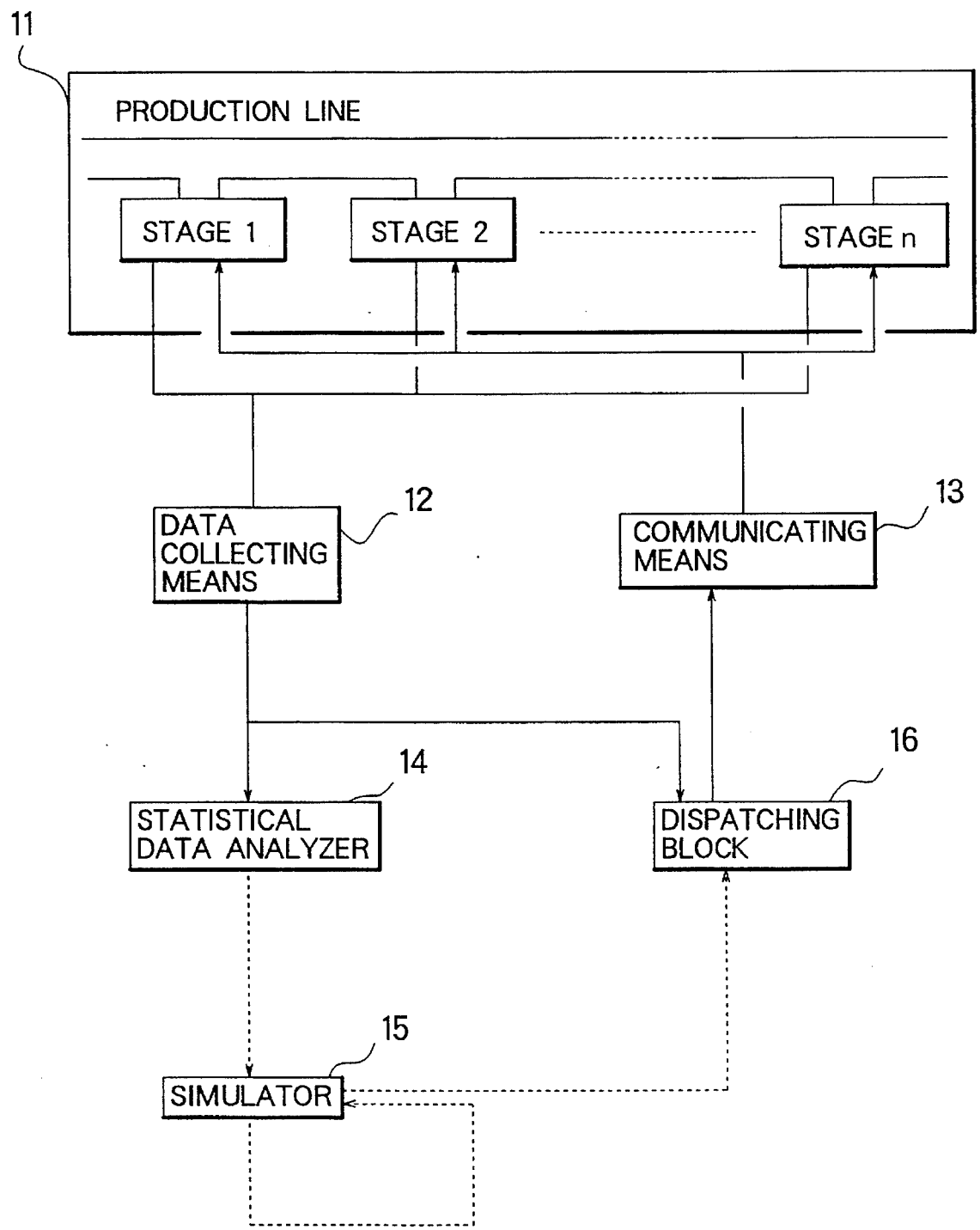
FIG. 2 is a block diagram showing a production control system according to an embodiment of the present invention.

FIG. 2 shows a production control system according to an embodiment of the present invention. In FIG. 2, the production control system is provided for a production line 11 for manufacturing electron devices such as semiconductor devices, the production line including a variety of apparatuses effecting respective stages including stage 1 through stage n. The production control system comprises data collecting means 12, a statistical data analyzer 14, a dispatching block 16, a simulator 15 and communicating means 13.

The data collecting means 12 continuously collects, from a production line 11, status data for each of lots of devices or production-to-be and each of apparatuses effecting for stages 1 through n, such as data on types and quantity of semiconductor devices to be processed, starting and ending time instants of processing, and operating conditions of the apparatuses. The statistical data analyzer 14 accumulates data obtained from the data collecting means 12 for a certain fixed period of time, for example, one week and statistically processing the accumulated data to create various kinds of statistical data including various data such as distribution of lots arriving at each stage or probability and deviation in arrival of lots of a certain process condition.

The dispatching block 16 has a function for allocating lots to apparatuses at each of stages by providing productive instruction data to the production line. The productive instruction data is obtained by processing data from the data collecting means 12 on the basis of all of dispatching rules registered in the system beforehand, to obtain a highest efficiency. The simulator 15 has an appropriate model for a production line or a portion thereof and receives the statistical data created at the statistical data analyzer 14. The simulator 15 simulates a state of production for the production line or portion thereof in the model and provides the dispatching block 16 with data to evaluate a difference in efficiency of the production line for different dispatching rules stored therein. The communicating means 13 has a function for transmitting productive instruction data output from the dispatching block 16 to each of apparatuses of the production line 11.

In operation, regular data flows are effected such that data collected from the production line 11 by the data collecting means 12 are received by the dispatching block 16. The dispatching block 16 then allocates lots of devices to be processed to a specified apparatus of each stage on the basis of a dispatching rule currently employed, for example, a first-in first-out rule. In addition to the regular data flows, second data flows are effected such that data obtained by the data collecting means 12 are transmitted to the statistical data analyzer 14. The data transmitted to the statistical data analyzer 14 are accumulated for a fixed period of time, for example, one week and then processed therein to obtain statistical data within the week. In FIG. 2, a solid line represents the regular data flow occurring in real time, while a dashed line represents a second data flow occurring periodically at predetermined intervals.

The statistical data thus obtained are periodically input to the simulator 15 so that the dispatching rules stored in the simulator 15 are successively applied to the statistical data in the simulating model of the simulator 15. The result of the simulation by applying each of the dispatching rules is consecutively output from the simulator 15 to the dispatching block 16, in which an optimum dispatching rule, for example, a lot selective rule is found as a dispatching rule providing an optimum efficiency in the production line. With this data processing, the allocation of lots to be processed at each stage is evaluated in parallel with the regular data flow. An optimum productive instruction data is then obtained according to the optimum dispatching rule to replace the current productive instruction data in the regular data flow, so that the efficiency of stages can be improved.

Figure 3:
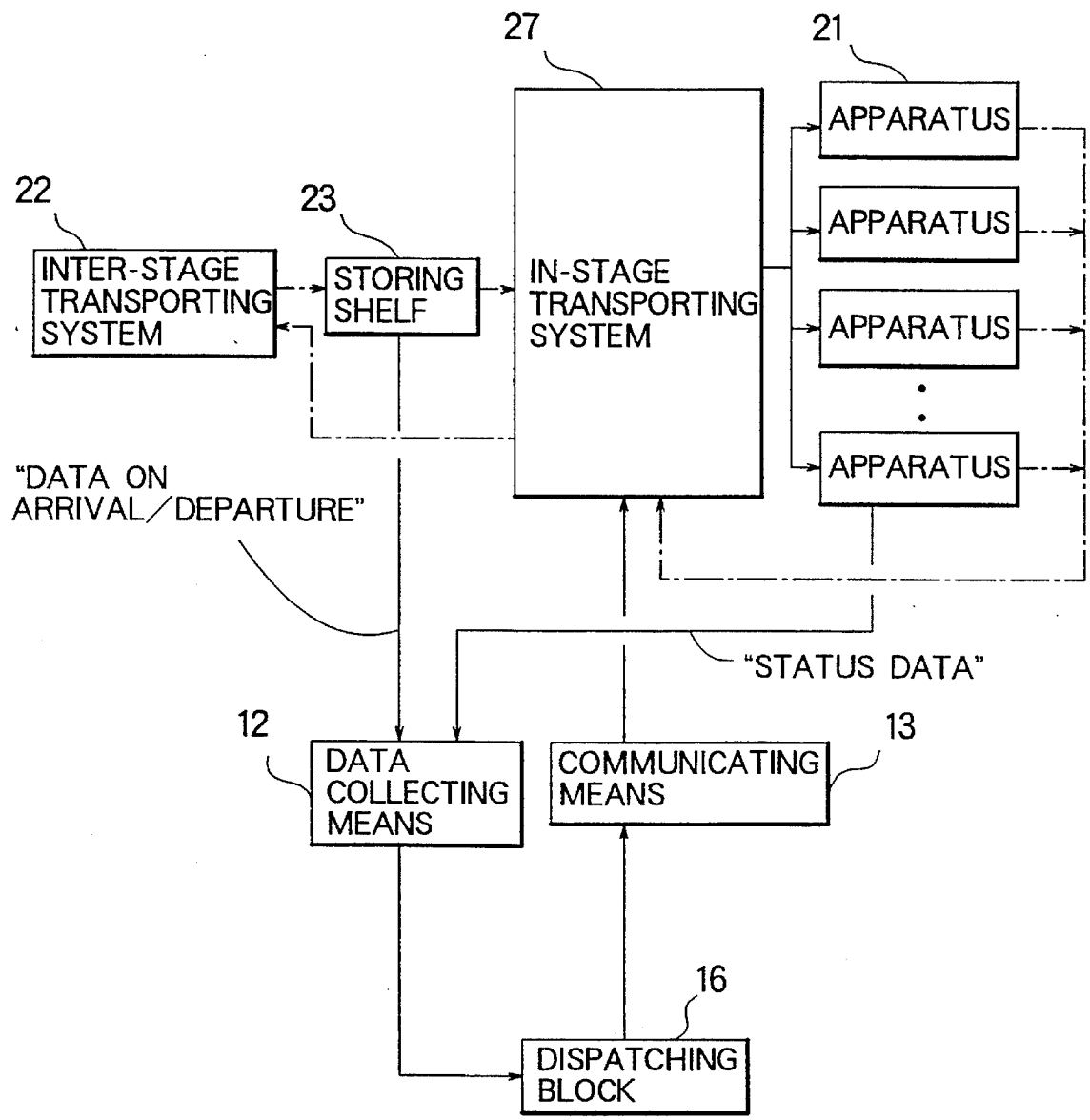
FIG. 3 is a block diagram showing an example of a hardware construction of a section for effecting one of the stages of the production control system in FIG. 2.

To help understanding of the present invention, one of the stages is taken up for describing operations of the production control system. FIG. 3 shows regular data flows between a section in the production line for effecting one of the stages and the production control system of FIG. 2.

As shown by a chain line in FIG. 3, lots of devices to be processed are transported from preceding sections by an inter-stage transporting system 22 to the section of FIG. 3 including a plurality of apparatuses 21 of the same kind provided for effecting the stage. The lots are temporarily stored on a storing shelf 23. As shown by solid lines, the data collecting means 12 collects data on the arrival/departure of lots and status data of the apparatuses, such as the starting time and ending time of work, current conditions of the apparatuses, numbers of lots stored in the shelf to be processed and quantity of the devices in each of the lots to be processed, from each of the apparatuses 21 and storing shelf 23, then provides the collected data to the dispatching block 16. The dispatching block 16 creates productive instruction data based on the collected data and the dispatching rule now effective. The communicating means 13 transmits the productive instruction data to an in-stage transporting system 27.

Then, the in-stage transporting system 27 takes out a lot or lots specified in the productive instruction data from the storing shelf 23 as a new lot, conveys the new lot to one of apparatuses 21 specified in the productive instruction data, and sets the lot therein. The one of the apparatuses 21 then starts processing of the lot. The lot thus processed is conveyed again to the inter-stage transporting system 22 by the in-stage transporting system 27. The inter-stage transporting system 22 then conveys the lot to another section for a subsequent stage. In this manner, lots are allocated to one of apparatuses, and the production line is operated for completing processing of the lots.

There are various kinds of dispatching rules used for allocating lots to a specified apparatus for each stage. An efficiency including a throughput, amount of time for waiting a lot and the rate of processing quantity varies depending on a dispatching rule selected and employed for lot allocation. For example, it seems rational to employ a first-in first-out rule for taking out lots in the order of their arrival and allocating them to idle apparatus. However, this does not necessarily provide a good result, since the optimum result can be obtained depending on the type and current conditions of processing effected by the apparatus as well as the type and quantity of the lots to be processed.

For example, suppose that an apparatus is able to process up to three lots of electron devices at a time and also able to operate under a plurality of processing conditions, but that, for processing a plurality of lots at a time, these lots should be identical in terms of processing conditions applied thereto in the apparatus. In this case, a better efficiency will be attained by selecting lots of the same processing conditions from among those stored on the storing shelf 23 according to a "lot selective rule", in which lots of the same processing condition are selected for processing. In other words, the first-in first-out rule is not suited for this case. However, when a lot selective rule is used, another problem arises in the case where the storing shelf 23 keeps only two lots or fewer of the same processing conditions. In such a case, the problem is whether the lot or lots on the shelf should be set right now to one of the apparatuses, or arrival of a lot or lots of the same processing condition should be waited for. The lot selective rule is not only one because the lot size of a lot to be processed in an apparatus is different from stage to stage, from device to device to be manufactured and operating conditions of the equipment. In either case, a dispatching rule for allocating lots to one of the apparatuses is determined according to the condition in arrival of lots at this section. Dispatching rules should include a dead line rule for a case in which a dead line of a lot is critical.

As described above, it is difficult to determine an optimum dispatching rule merely from empirical knowledge. Hence, according to the embodiment, data on each of sections in a production line are collected periodically at predetermined intervals, via dotted signal paths as shown in FIG. 2. The collected data are statistically processed, and the allocation of lots is simulated based on the statistical data for determining an optimum dispatching rule.

Figure 5:
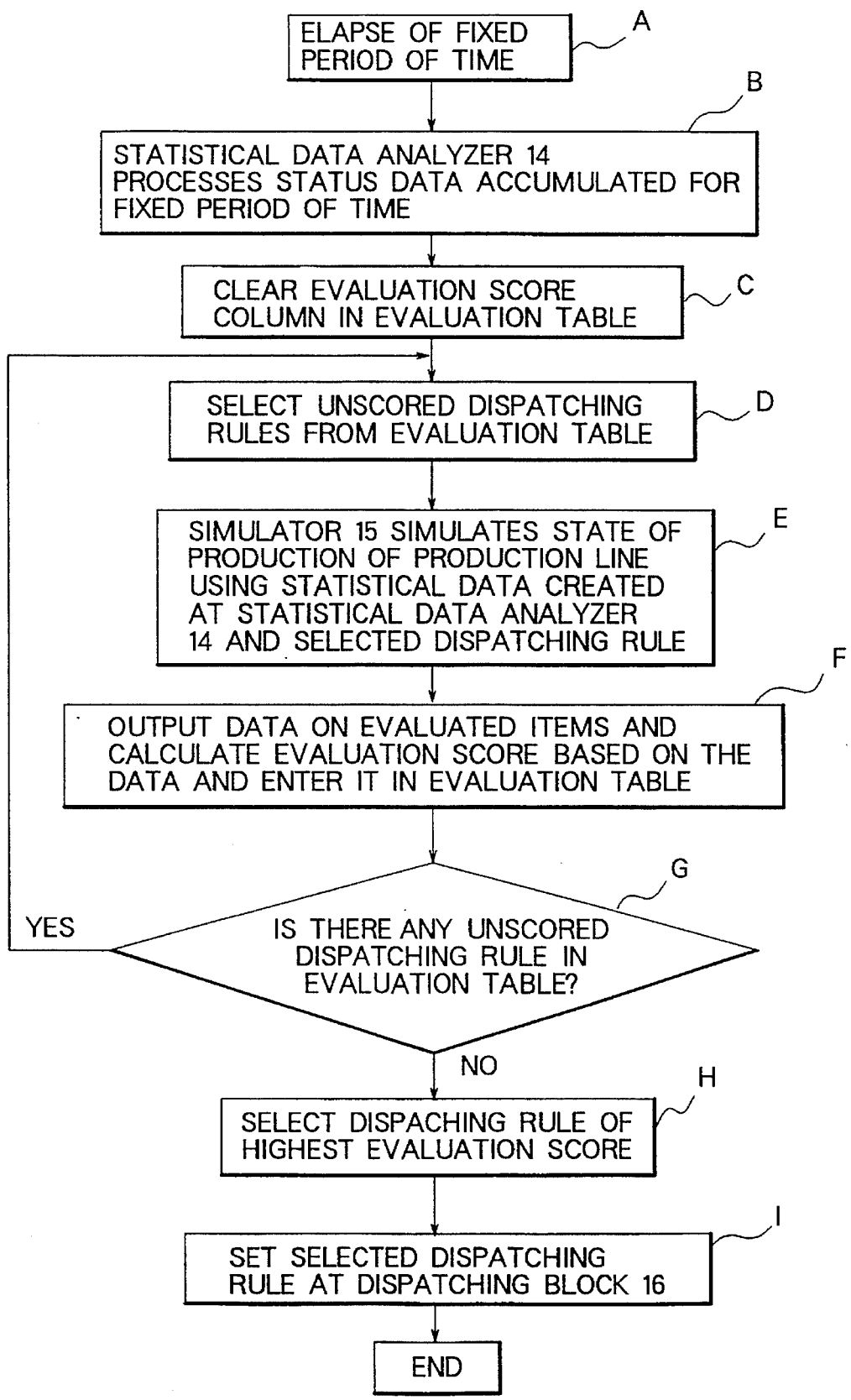
FIG. 5 is a flow chart showing a procedure for determining an optimum dispatching rule.

With reference to FIGS. 4 and 5, description will be given to the procedure of determining an optimum dispatching rule using data flows represented by dashed lines in FIG. 2. FIG. 4 is an example of an evaluation table showing an principle of evaluation in dispatching rules stored in the system. The dispatching rules in the table include a first-in first-out rule, three of lot selective rules and a dead line rule. FIG. 5 is a flow chart showing a procedure in which an optimum dispatching rule is selected among the dispatching rules in the table of FIG. 4. At steps A and B in FIG. 5, after status data of the production line are accumulated for a certain fixed period of time, the statistical data analyzer 14 in FIG. 2 statistically processes the accumulated status data to obtain statistical data including probability and deviation in arrival of each of lots to be processed. At step C, the statistical data is input to the simulator 15, and the evaluation score column in the evaluation table of FIG. 4 is cleared.

At step D, one of dispatching rules listed in the evaluation table is selected among those whose score column are vacant. At step E, the simulator simulates state of production on the production line or a portion thereof in a simulation model in the simulator using the statistical data created in the statistical data analyzer and the selected one of the dispatching rules. In the simulation as described above, state of production is simulated for a corresponding section of stage by using the statistical data such as the input distribution of lots arriving at the section and the distribution of amount of time required for lots to move from a preceding section to the section to be examined.

At step F, data indicative of states of production such as a throughput, amount of time for waiting a lot and the rate of processed quantity are obtained from the simulation and summed up to obtain an evaluation score representing an efficiency of the production line. The evaluation score thus obtained is entered in the evaluation table in FIG. 4 in a score column corresponding to the selected dispatching rule. Then, at step G, another dispatching rule whose evaluation score column is vacant in the evaluation table of FIG. 4 is selected and input to the simulator to obtain an evaluation score thereof. The steps for selecting one of dispatching rules, simulation by the simulator and enterring the score are repeated for all of the dispatching rules listed in the evaluation table.

After simulations are completed for all of the dispatching rules listed in the evaluation table, an optimum dispatching rule providing the highest evaluation score is selected in the evaluation table at step H. Then, at step I, the dispatching rule providing the highest evaluation score is compared with a current dispatching rule registered in the dispatching block 16 (FIG. 2) for replacing the current dispatching rule if the current dispatching rule is different from the dispatching rule providing the highest evaluation score.

As described above, through determining and employing the optimum dispatching rule for each stage, the production line can be operated at the best availability factor and throughput. In this embodiment, the optimum dispatching rule is determined for each stage. However, when a production line branches off into a plurality of branch lines, the optimum dispatching rule may be determined for each of the branch lines between the branch point and the meeting point thereof.

Also, if the optimum dispatching rule is determined for each of stages having a possibility of congestion of lots, the cause for the congestion can immediately be grasped to give an appropriate productive instruction data to the production line while the production line is operating. In the present embodiment, since the simulation to obtain the optimum dispatching rule can be carried out in parallel with the normal operation of the production line, the system has an advantage that the optimum dispatching rule can be determined without interrupting the operation of the production line.

Although the present invention is described with reference to the preferred embodiment, the present invention is not limited to such embodiment and it will be obvious for those skilled in the art that various modifications or alterations can be easily made based on the above embodiment within the scope of the present invention.

What is claimed is:

1. A production control system for a production line including at least one apparatus for each of a plurality of production stages to manufacture lots of products, said production control system comprising: data collecting means for collecting status data of said at least one apparatus for each of said production stages and data on lots to be processed; a data analyzer for accumulating said status data for a predetermined period of time to periodically generate a statistical data by statistically processing said status data; a simulator having at least one simulation model receiving said statistical data for periodically simulating at least a portion of said production line to evaluate an efficiency thereof based on a plurality of dispatching rules; and dispatching means for selecting an optimum dispatching rule among said plurality of dispatching rules based on the result of the simulation by said simulator to provide a productive instruction data for allocating a lot of product-to-be one of said at least one apparatus based on said optimum dispatching rule.

2. A production control system as defined in claim 1 wherein said predetermined period of time ranges between about one week and about one month.

3. A production control system as defined in claim 1 wherein said plurality of dispatching rules includes a first-in first-out rule, at least one lot selective rule and a dead line rule.

4. A production control system as defined in claim 1 wherein said dispatching means replaces a first productive instruction data currently effective by a second productive instruction data when a newly selected optimum dispatching rule is different from a previously selected optimum dispatching rule.

5. A production control system as defined in claim 1 wherein said production line produces lots of electron devices.

6. A production control system as defined in claim 1 further comprising a tabulation means for tabulating an evaluation score to select the optimum dispatching rule amongst said plurality of dispatching rules.

7. A production control system as defined in claim 6, further comprising means for comparing said optimum dispatching rule with a current dispatching rule for replacing said current dispatching rule if said current dispatching rule is different from said optimum dispatching rule.

8. A production control system as defined in claim 1, wherein the production line branches into a plurality of branch lines, further comprising means for determining an optimum dispatching rule for each of the branch lines.

9. A production control system as defined in claim 1, further comprising means for providing productive instruction data to reduce congestion of lots on said production line.

* * * * *